(12) United States Patent
West et al.

(10) Patent No.: US 9,409,151 B1
(45) Date of Patent: Aug. 9, 2016

(54) CALIBRATION AND OPTIMIZATION OF ESA IN AIRCRAFT RADOMES

(75) Inventors: James B. West, Cedar Rapids, IA (US); Daniel L. Woodell, Holts Summit, MO (US); Lee M. Paulsen, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 988 days.

(21) Appl. No.: 13/598,144

(22) Filed: Aug. 29, 2012

(51) Int. Cl.
| | |
|---|---|
| *H01Q 21/00* | (2006.01) |
| *B01J 23/00* | (2006.01) |
| *C01G 49/00* | (2006.01) |
| *B01J 23/78* | (2006.01) |
| *C01B 3/16* | (2006.01) |

(52) U.S. Cl.
CPC ............ *B01J 23/005* (2013.01); *B01J 23/78* (2013.01); *C01B 3/16* (2013.01); *C01G 49/009* (2013.01); *C01P 2002/32* (2013.01)

(58) Field of Classification Search
USPC .................. 342/368, 175, 372; 343/754, 853, 343/700 MS, 757
See application file for complete search history.

(56) References Cited

U.S. PATENT DOCUMENTS

| | | | | |
|---|---|---|---|---|
| 4,656,477 A | * | 4/1987 | Ronconi | G01S 13/762 342/37 |
| 5,442,364 A | * | 8/1995 | Lee | H01Q 3/22 342/25 C |
| 6,778,137 B2 | * | 8/2004 | Krikorian | G01S 7/282 342/371 |
| 8,154,452 B2 | * | 4/2012 | Webb | H01Q 3/267 342/174 |
| 8,334,809 B2 | * | 12/2012 | Nichols | H01Q 1/3275 343/700 MS |
| 8,824,579 B2 | * | 9/2014 | Thomas | H04B 7/0469 375/260 |

\* cited by examiner

*Primary Examiner* — Tho G Phan
(74) *Attorney, Agent, or Firm* — Angel N. Gerdzhikov; Donna P. Suchy; Daniel M. Barbieri

(57) ABSTRACT

A method for calibrating an ESA radar to mitigate degradation of its radiation system. The radiation system includes the distribution manifold, the ESA radiating elements and the radome the ESA may be operating through. Sensing of degradation takes place both locally with a switchable matched load to identify individual ESA element characteristics and globally with target based radar return data. The data generated by this sensing of both local and global characteristics is then used to modify available ESA element complex weighting to produce a desired far-field radiation pattern.

10 Claims, 10 Drawing Sheets

CALIBRATION AND OPTIMIZATION OF ESA IN AIRCRAFT RADOMES

FIELD OF THE INVENTION

The present invention is directed generally toward aircraft mounted radar, and more particularly toward optimizing and calibrating electronically steerable antennas (ESAs).

BACKGROUND OF THE INVENTION

Aircraft radars are commonly housed inside a radome. A radome is a housing specially designed to be transparent at the radar's frequencies. Over time, the radome can accumulate defects that interfere with radar signals. Radome degradation traditionally requires the radome to be replaced.

Also, some radars have ESAs. ESAs are antennas composed of a number of radiating elements. By manipulating the signal sent to each radiating element, a computer can alter the direction of a signal transmitted by an ESA. ESAs can degrade over time as radiating elements of the ESA fail.

Also, some radars have distribution manifolds that split or distribute the transmitted signal to the individual or groups of ESA elements. The manifold may also combine radar return signals from individual or groups of ESA radiating elements. The amplitude and phase of signals passing through the distribution manifold may vary over time from aging effects such as temperature cycling, component variation, or vibrations. These variations can cause the radar beam to be sufficiently degraded as to require the radar to be removed from the aircraft for repair or replacement.

Radome degradations, ESA failures, and Distribution Manifold variations adversely impact the usable life of a radar system and impose maintenance requirements. The useable life of radomes and ESA based radars could be extended if they could be re-calibrated and optimized to account for certain degradations.

Consequently, it would be advantageous if an apparatus existed that is suitable for optimizing and calibrating an ESA radar in a radome and/or radiating elements in an ESA radar in a radome.

SUMMARY OF THE INVENTION

Accordingly, the present invention is directed to a novel method and apparatus for optimizing and calibrating an ESA radar in a radome and/or radiating elements in an ESA.

In one embodiment, a known matching load may be used to accurately measure coupling between radiating elements in an ESA radar. By measuring coupling, a computer may determine if any radiating elements in the ESA radar have a soft failure with operating characteristics outside the tolerance of their desired commanded characteristics or have a hard failure. If any radiating elements have failed or are operating outside their commanded characteristics tolerance, the computer may alter signals sent to either the element in question or surrounding radiating elements for functional mitigation.

In another embodiment of the present invention, an ESA radar may send a signal toward a dominant target. The ESA radar may receive a return signal and analyze the return signal to identify any distortion due to defects in the radome. A computer may then alter future signals sent by the ESA to functionally mitigate the measured radome distortion.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
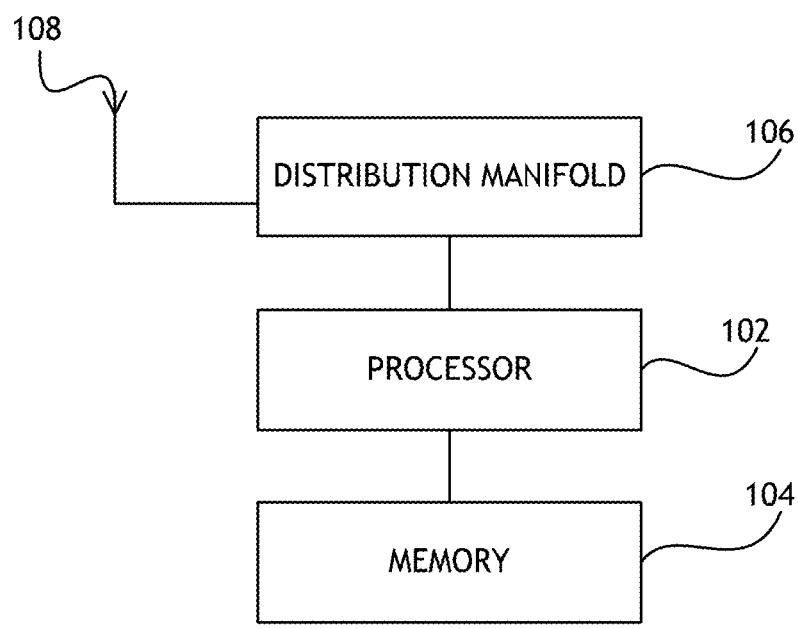
FIG. 1 shows a block diagram of a computer system useful for implementing embodiments of the present application.

Referring to FIG. 1, a block diagram of a computer system useful for implementing embodiments of the present application is shown. A computer system may include a processor 102 configured to implement computer executable program code, memory 104 connected to the processor 102, a distribution manifold 106 connected to the processor 102 for distributing signals to individual radiating elements in an ESA and combining signals received from individual radiating elements in an ESA, and an antenna 108 to send and receive signals. The antenna 108 may be an ESA having a plurality of radiating elements that interact to produce a signal. The processor 102 may send a distinct signal to two or more radiating elements in the antenna 108, through the distribution manifold 106, such that each radiating element produces a signal that interacts with signals produced by other radiating elements.

Figure 2:
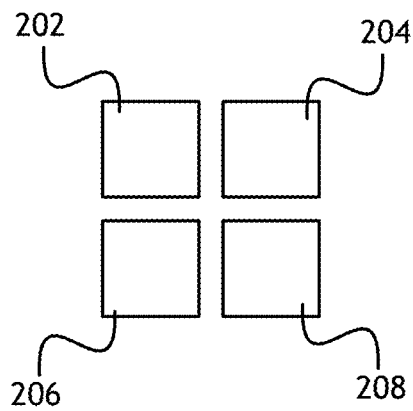
FIG. 2 shows a block diagram of radiating elements in an ESA antenna.

Referring to FIG. 2, a block diagram of radiating elements in an ESA radar is shown. An ESA radar may comprise an ESA antenna having an array of radiating elements 202, 204, 206, 208. By manipulating the signal sent to each radiating element 202, 204, 206, 208, a computer processor may alter the properties of a combined signal. For example, a first radiating element 202 may produce a signal that constructively or destructively interferes with a signal produced by a second radiating element 204. Likewise, a third radiating element 206 may produce a signal that constructively or destructively interferes with a signal produced by a fourth radiating element 208. Furthermore, the first radiating element 202 may produce a signal that constructively or destructively interferes with a signal produced by the third radiating element 206. All of the interactions of radiating elements 202, 204, 206, 208 in an ESA may work to steer the direction of a combined signal or alter the waveform or manipulate other properties. A person skilled in the art may appreciate that even though four radiating elements 202, 204, 206, 208 are shown, in actual implementation an ESA antenna may comprise more than four radiating elements 202, 204, 206, 208.

Figure 3:
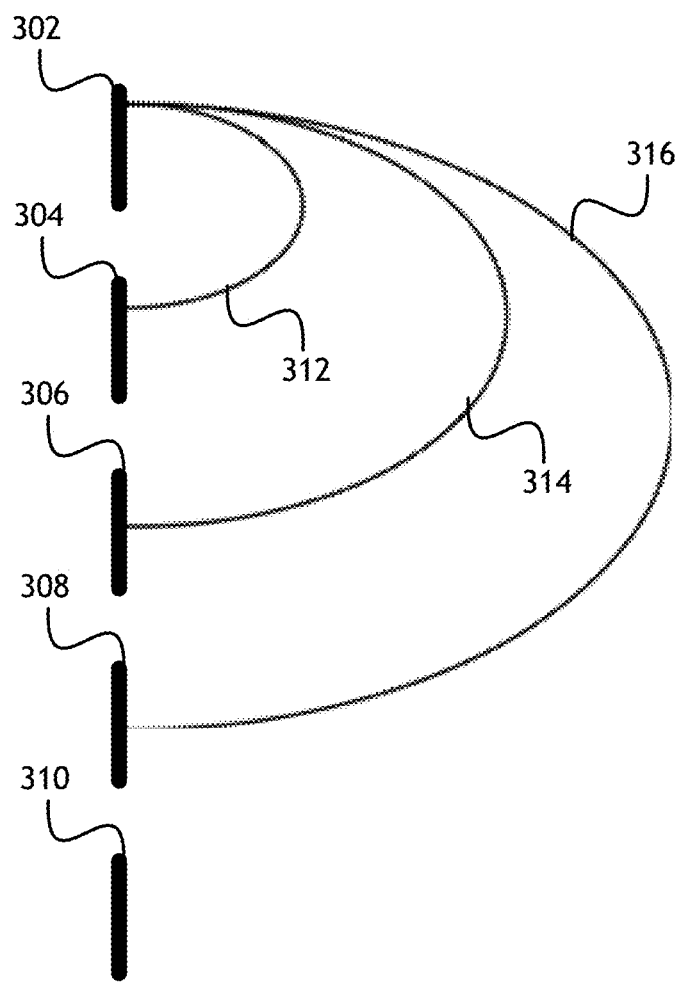
FIG. 3 shows a cross-sectional representation of signal interaction between multiple radiating elements in an ESA antenna.

Referring to FIG. 3, a cross-sectional representation of signal interaction between multiple radiating elements of an ESA antenna in an ESA radar is shown. Radiating elements 302, 304, 306, 308, 310 in an ESA antenna may be arranged such that signals from two or more radiating elements 302, 304, 306, 308, 310 may interact to produce a combined signal having certain characteristics. For example, a first radiating element 302 and second radiating element 304 may interact through constructive and destructive interference to produce a first signal 312 having certain specific characteristics such as direction, phase and amplitude. Likewise, the first radiating element 302, second radiating element 304 and a third radiating element 306 may interact through constructive and destructive interference to produce a second signal 314 having certain, different characteristics such as direction, phase and amplitude. The second signal 314 may be a variation of the first signal 312 due to the added interaction of the third radiating element 306. Furthermore, the first radiating element 302, second radiating element 304, third radiating element 306 and a fourth radiating element 308 may interact through constructive and destructive interference to produce a third signal 316 having certain, different characteristics such as direction, phase and amplitude. The third signal 316 may be a variation of the second signal 314 due to the added interaction of the fourth radiating element 308.

Figure 4:
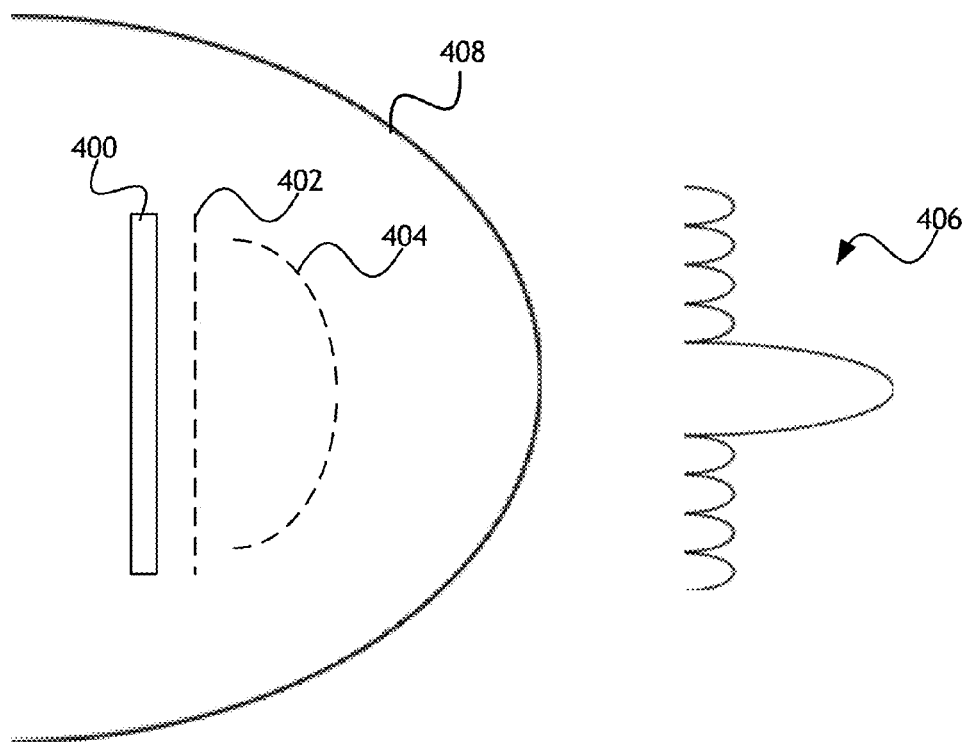
FIG. 4 shows a diagram of near and far field radiation patterns from an ESA radar in a radome.

Referring to FIG. 4, a diagram of near and far field radiation patterns from an ESA radar in a radome is shown. Through interactions of radiating elements, an ESA radar 400 may produce a signal having properties expressed as an aperture phase 402 and an aperture amplitude 404. The aperture phase 402 and aperture amplitude 404 may be specifically calibrated to work with a radome 408 such that the radome 408 is effectively transparent to the signal. Outside the radome 408, the signal may be perceived as a well-defined far-field radiation pattern 406 having certain desirable properties. A hard or soft failure of any one radiating element in the ESA radar 400 may adversely impact the properties of the far-field radiation pattern 406.

A computing device sending signals to radiating elements in an ESA antenna in an ESA radar 400 could alter signals to certain radiating elements to mitigate the effects of one or more radiating elements having sub-optimal performance if the computing device could receive an accurate measurement of mutual coupling terms between discrete radiating elements. For example, referring to FIG. 2, if a computing device could receive an accurate measurement of the mutual coupling between the first radiating element 202 and the second radiating element 204 without contribution of a third radiating element 206 and a fourth radiating element 208, the computing device could determine if the first radiating element 202 is performing sub-optimally and thereby determine a correction to apply to surrounding radiating elements 204, 206, 208. The computing device may calibrate each radiating element 202, 204, 206, 208 in turn to produce amplitude and phase adjustments for each radiating element 202, 204, 206, 208. Amplitude and phase adjustments for each radiating element 202, 204, 206, 208 may be stored in a matrix or some other appropriate data structure.

Figure 5:
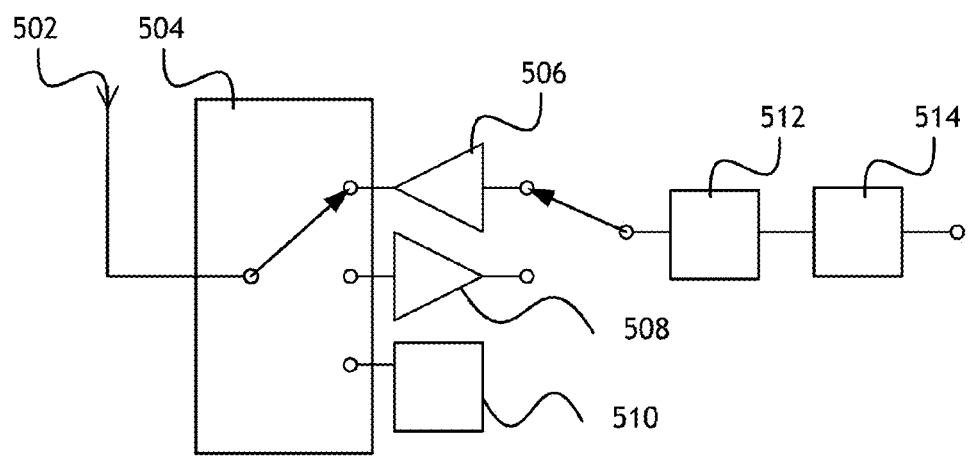
FIG. 5 shows a block diagram of a circuit for testing radiating elements in an ESA antenna in an ESA radar while in transmit mode.

Referring to FIG. 5, block diagram of a circuit for testing radiating elements of an ESA antenna in an ESA radar while in transmit mode is shown. While calibrating radiating elements in an ESA antenna, a first radiating element 502 may be connected to a high-power transmitter receiver switch 504. The high-power transmitter receiver switch 504 may have switch states; a first state, corresponding to a transmit mode, may connect to a power amplifier 506; a second state, corresponding to a receive mode, may connect to a low-noise amplifier 508; and a third state may connect to a matched load 510. The matched load 510 may provide a known load to any radiating elements in the third state.

The circuit may also include a variable attenuator 512 connected to a phase shifter 514. The variable attenuator 512 and phase shifter 514 are elements for sending and receiving signals to radiating elements in an ESA. The variable attenuator 512 may be connected to the power amplifier 506 or the low-noise amplifier 508 depending on the state of the high-power transmitter receiver switch 504. The phase shifter 514 for each radiating element 502 may be connected to a distribution manifold (not shown); or, alternatively, one or more elements of the circuit may comprise portions of a distribution manifold.

When calibrating the first radiating element 502, a high-power transmitter receiver switch 504 connected to the first radiating element 502 may be set to a transmit mode so that the first radiating element 502 is connected to the power amplifier 506 and the variable attenuator 512 is connected to the power amplifier 506. A computing device may then induce a signal in the first radiating element 502 through the phase shifter 514 and variable attenuator 512.

Figure 6:
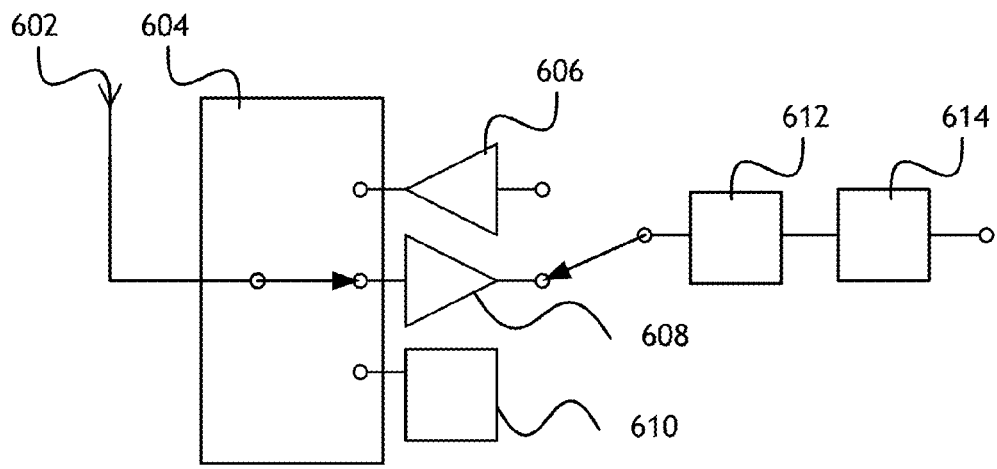
FIG. 6 shows a block diagram of a circuit for testing radiating elements in an ESA antenna in an ESA radar while in receive mode.

Referring to FIG. 6, a block diagram of a circuit for testing radiating elements of an ESA antenna in an ESA radar while in receive mode is shown. When calibrating a first radiating element, an adjacent or associated second radiating element 602 may be connected to a high-power transmitter receiver switch 604 substantially similar to the high-power transmitter receiver switch of FIG. 5. The high-power transmitter receiver switch 604 connected to the second radiating element 602 may be set to a receive mode so that the second radiating element 602 is connected to a low-noise amplifier 608 and a variable attenuator 612 is connected to the low-noise amplifier 608. A computing device may then receive a signal through the second radiating element 602 through the phase shifter 614 and variable attenuator 612. The signal received through the second radiating element 602 may be sent though the first radiating element; for example, a radiating element such as shown in FIG. 5. Coupling between a first radiating element and a second radiating element 602 may thereby be measured.

Figure 7:
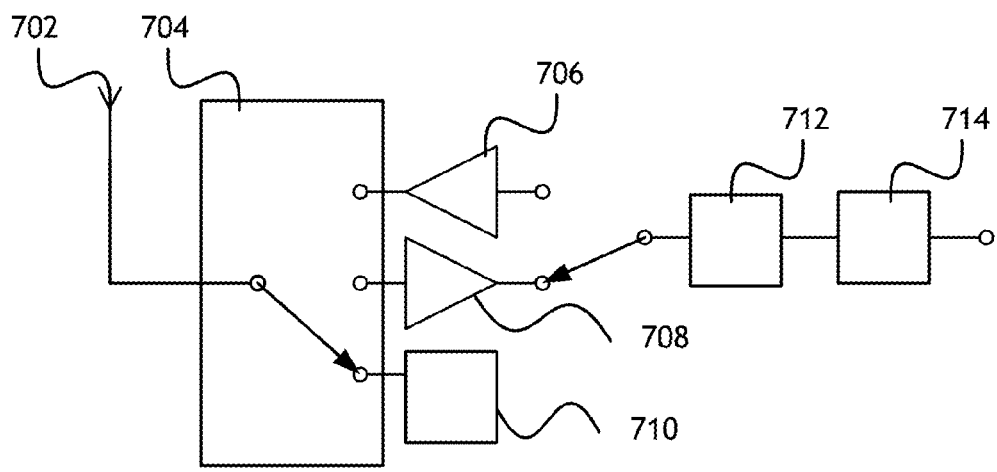
FIG. 7 shows a block diagram of a circuit for testing radiating elements in an ESA antenna in an ESA radar while connected to a matching load.

Referring to FIG. 7, a block diagram of a circuit for testing radiating elements of an ESA antenna in an ESA radar while connected to a matching load is shown. When calibrating a first radiating element, remaining radiating elements 702 not associated with the first radiating element, or for which coupling is not being measured, may be connected to a high-power transmitter receiver switch 704 substantially similar to the high-power transmitter receiver switch of FIG. 5 and FIG. 6. High-power transmitter receiver switches 704 connected to the remaining radiating elements 702 may be set to connect the remaining radiating elements 702 to identical matching loads 710. Variable attenuators 712 associated with high-power transmitter receiver switches 704 may be connected to low-noise amplifiers 708. The remaining radiating elements 702 may thereby be segregated from a first radiating element and a second radiating element so that coupling between the first radiating element and the second radiating element can be measured accurately.

Figure 8:
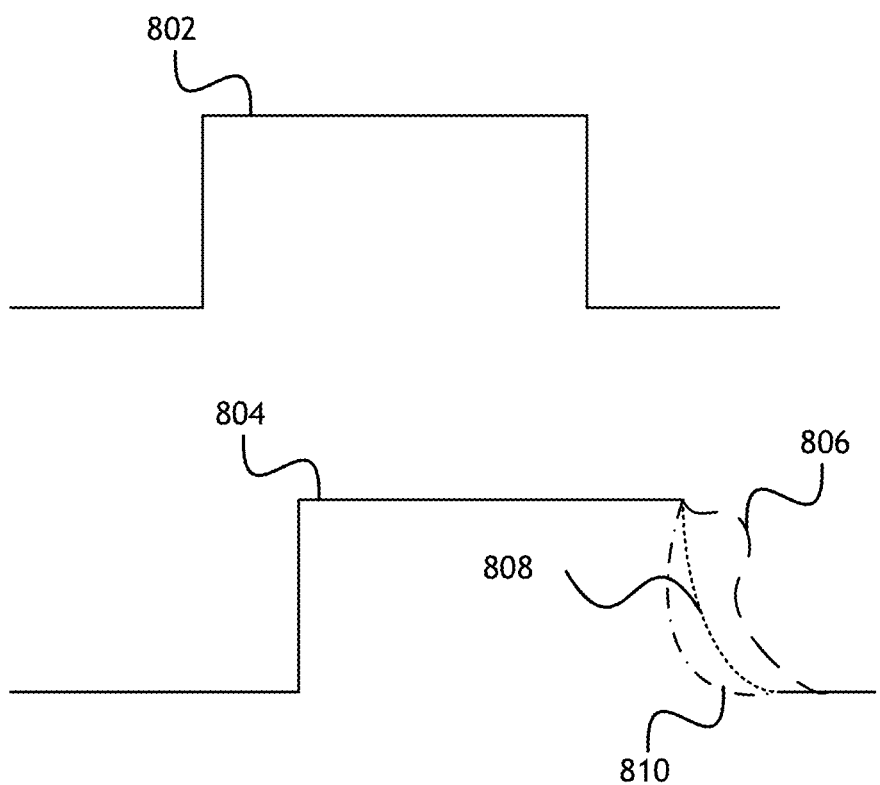
FIG. 8 shows waveforms of a transmitted and received signal in an ESA antenna.

Referring to FIG. 8, waveforms of a transmitted and received signal in an ESA antenna is shown. While calibrating a first radiating element by measuring coupling between the first radiating element and a second radiating element, the first radiating element may produce a transmission signal 802. A computing device may receive a corresponding signal 804 through a second radiating element. The corresponding signal 804 may include bleed through discharge comprising a distortion to the trailing edge of the corresponding signal 804. Depending on the condition of the first radiating element and the second radiating element, the bleed through discharge may be a healthy waveform 808 or some other unhealthy waveform 806, 810. Based on the properties of the unhealthy waveform 806, 810, a computing device may determine a correction to the amplitude and phase of the first radiating element to adjust the bleed through discharge back to a healthy waveform 808. All future transmission through the first radiating element may be adjusted according to the correction. The computing device may also determine that one or more radiating elements are performing such that no correction is possible to mitigate the effects of the unhealthy waveform 808, and that more extensive servicing is required.

Furthermore, a computing device may analyze data from one or more radiating elements to determine the health of a distribution manifold connected to each of the one or more radiating elements in an ESA radar. The computing may determine a modification to the distribution manifold; or alternatively, the computing device may determine that no modification to the distribution manifold is possible.

Figure 9:
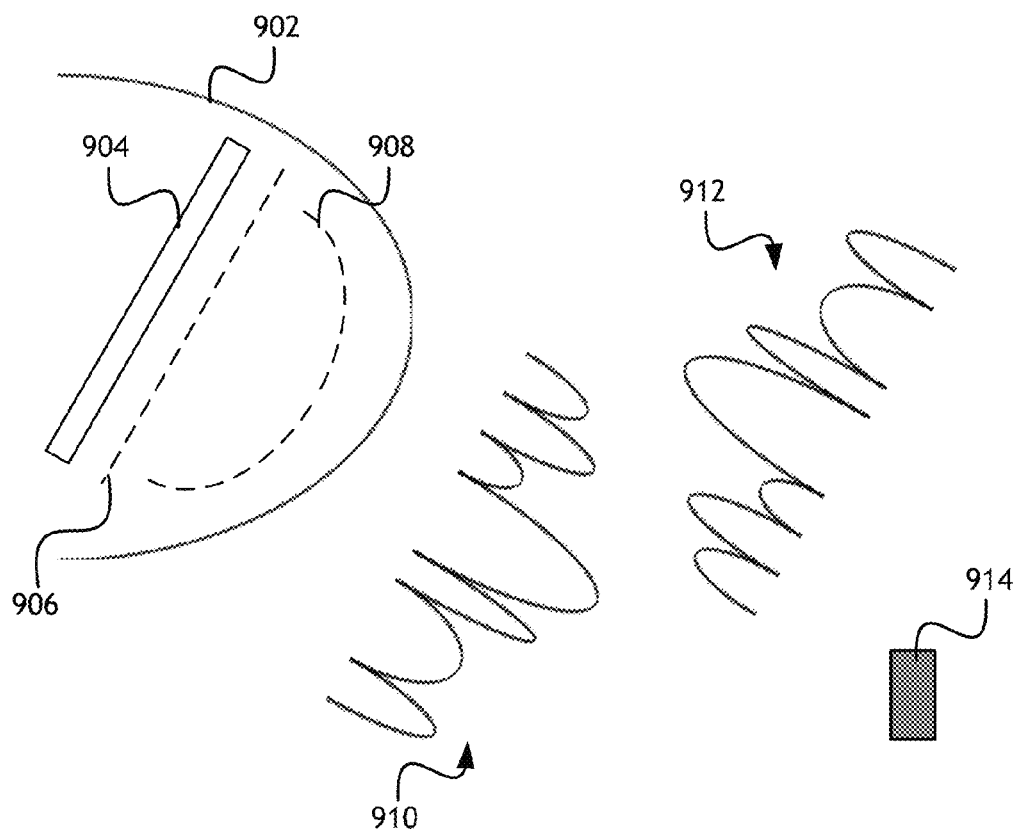
FIG. 9 shows a representation of an ESA radar in a radome sending signals to a known target.

Referring to FIG. 9, a representation of an ESA radar in a radome sending signals to a dominant target is shown. An aircraft may comprise an ESA radar 904 inside a radome 902 configured to be effectively transparent to signals from the ESA radar 904. Over time, the radome 902 may accumulate wear and defects that cause distortion to signals from the ESA radar 904. The ESA radar 904 may produce a signal having properties expressed as an aperture phase 906 and an aperture amplitude 908. Outside the radome 902, where the radome 902 includes accumulated defects and wear, the signal may be perceived as a distorted far-field radiation pattern 910 having certain undesirable properties.

Where there is a dominant target 914, a computing device may generate a signal and transmit the signal through the ESA radar 904 and the radome 902 to produce a distorted far-field radiation pattern 910. The distorted far-field radiation pattern 910 may reflect off of the dominant target 914 and return to the ESA radar 904 as a reflected distorted far-field radiation pattern 912. The dominant target 914 may comprise a point target.

A computing device receiving the reflected distorted far-field radiation pattern 912 may analyze the reflected distorted far-field radiation pattern 912 to determine what distortions are being caused by the defects in the radome 902. The computing device may then superimpose an amplitude and phase pre-distortion onto the aperture excitation of the ESA radar 904 to produce a pre-distorted signal, such that the pre-distorted signal may be "distorted" into a desired far-field radiation pattern, and thereby mitigate the effect of wear and defects from the radome 902.

The computing device may calibrate each radiating element in an ESA antenna of the ESA radar 904 to produce an adjustment to the aperture phase 906 and aperture amplitude 908. Amplitude and phase adjustments for each radiating element may be stored in a matrix or some other appropriate data structure.

Figure 10:
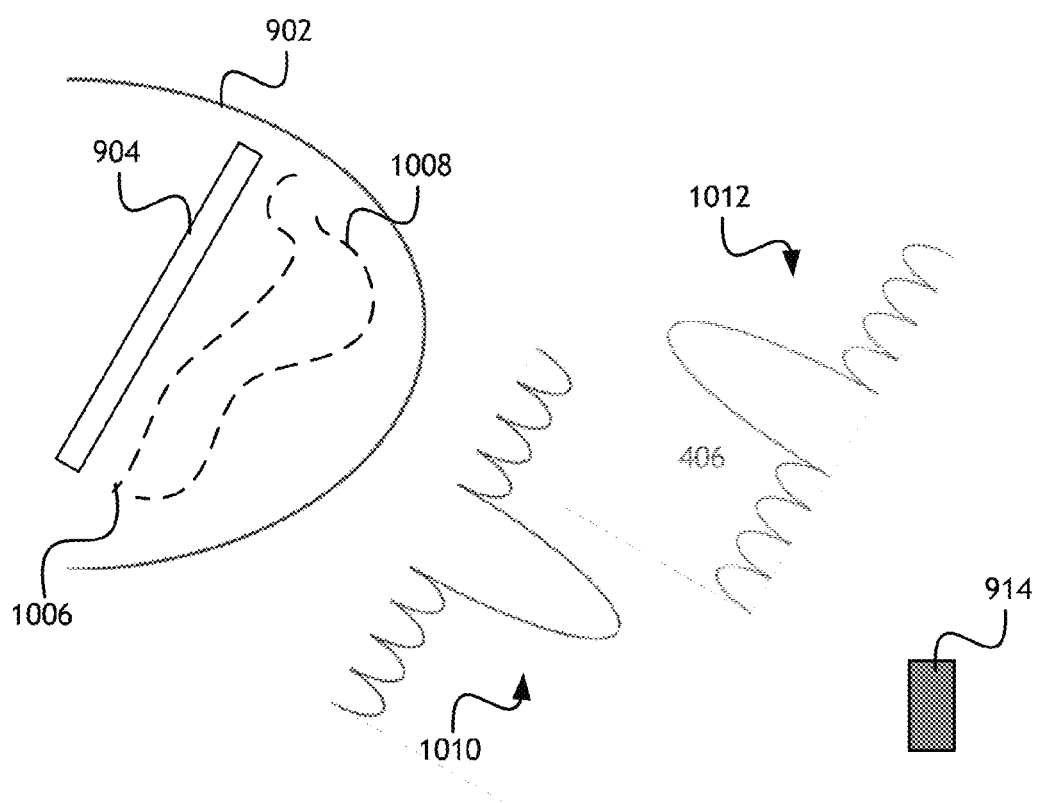
FIG. 10 shows a representation of an ESA radar in a radome sending modified signals to a known target.

Referring to FIG. 10, a representation of an ESA radar in a radome sending modified signals to a dominant target is shown. A computing device may produce an adjusted aperture phase 1006 and an adjusted aperture amplitude 1008 through an amplitude and phase pre-distortion onto the aperture excitation to create a modified far-field radiation pattern 1010. The adjusted aperture phase 1006 and adjusted aperture amplitude 1008 may interact with a radome having certain defects and wear that modify the adjusted aperture phase 1006 and adjusted aperture amplitude 1008 to create the modified far-field radiation pattern 1010 such that the modified far-field radiation pattern 1010 has certain desirable properties.

Where there is a dominant target 914, a computing device may generate an adjusted aperture phase 1006 and an adjusted aperture amplitude 1008 and transmit the signal through the radome 902 to produce a modified far-field radiation pattern 1010. The modified far-field radiation pattern 1010 may reflect off of the dominant target 914 and return to the ESA radar 904 as a reflected modified far-field radiation pattern 1012.

A computing device receiving the reflected modified far-field radiation pattern 1012 may analyze the reflected modified far-field radiation pattern 1012 to determine that the modified far-field radiation pattern 1010 is properly modified.

Figure 11:
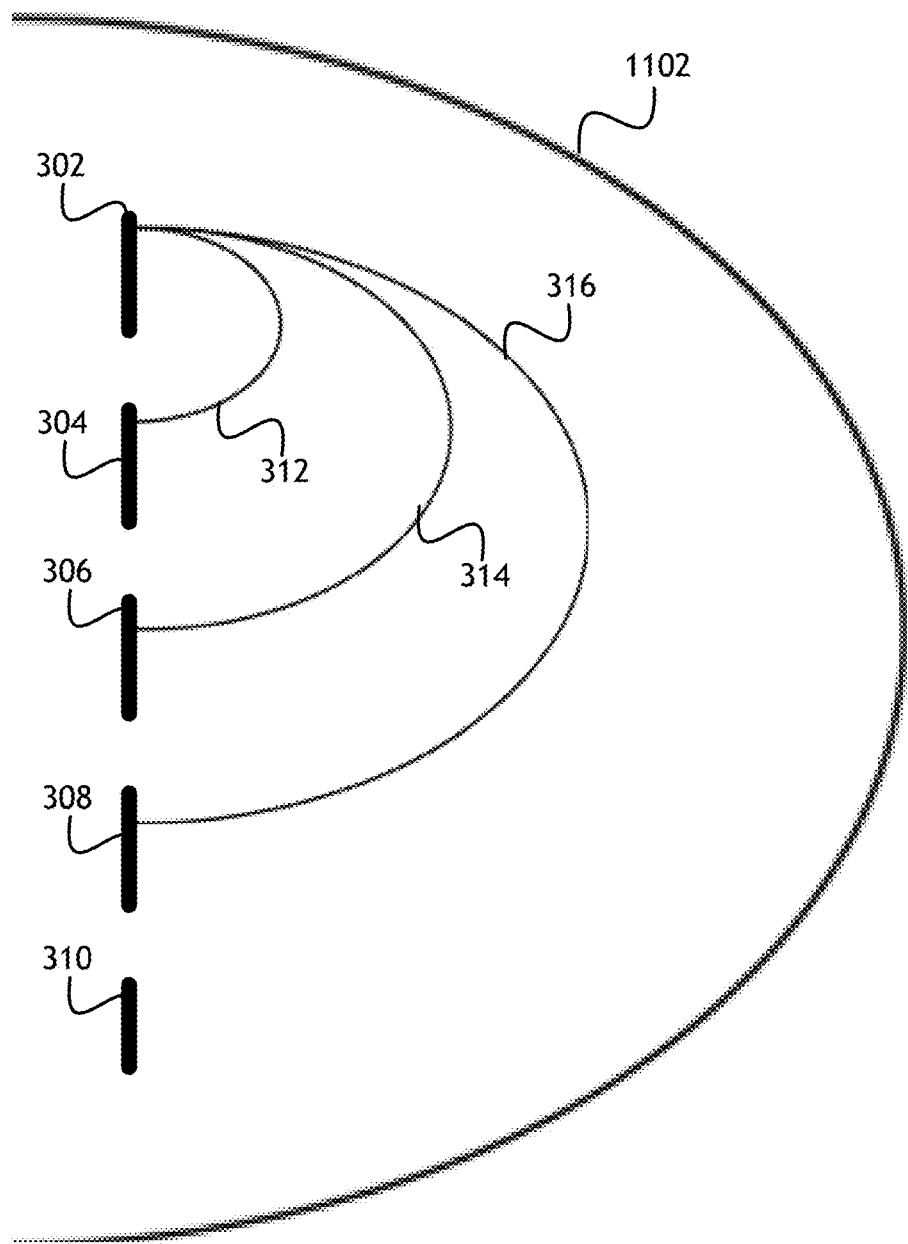
FIG. 11 shows a representation of signal interaction between multiple radiating elements in an ESA antenna in a radome.

Referring to FIG. 11, a representation of signal interaction between multiple radiating elements in an ESA antenna in a radome is shown. In another embodiment of the present invention, a computing device may analyze the condition of radiating elements 302, 304, 306, 308, 310 in an ESA antenna and determine adjustments to a far-field signal by receiving a signal reflected of the inside of a radome 1102.

Radiating elements 302, 304, 306, 308, 310 in an ESA antenna may be arranged such that signals from two or more radiating elements 302, 304, 306, 308, 310 may interact to produce a combined signal having certain characteristics. For example, a first radiating element 302 and second radiating element 304 may interact through constructive and destructive interference to produce a first signal 312 having certain specific characteristics such as direction, phase and amplitude. Likewise, the first radiating element 302, second radiating element 304 and a third radiating element 306 may interact through constructive and destructive interference to produce a second signal 314 having certain, different characteristics such as direction, phase and amplitude. The second signal 314 may be a variation of the first signal 312 due to the added interaction of the third radiating element 306. Furthermore, the first radiating element 302, second radiating element 304, third radiating element 306 and a fourth radiating element 308 may interact through constructive and destructive interference to produce a third signal 316 having certain, different characteristics such as direction, phase and amplitude. The third signal 316 may be a variation of the second signal 314 due to the added interaction of the fourth radiating element 308.

Signals such as the third signal 316 may reflect off of the inside of the radome 1102. In one embodiment of the present invention, a computing device may receive the reflected signal and compare the reflected signal to a reference signal corresponding to a healthy ESA radar and radome.

Figure 12:
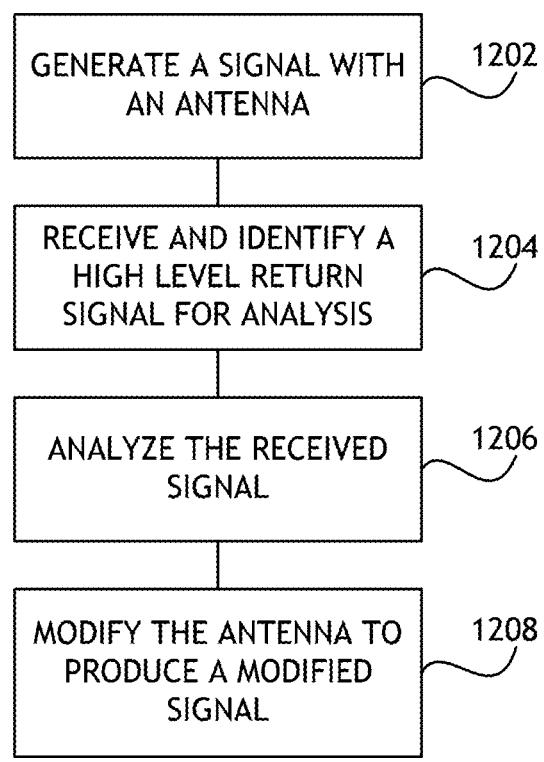
FIG. 12 shows a flowchart of a method for calibrating an ESA radar based on a dominant target.

Referring to FIG. 12, a flowchart of a method for calibrating an ESA radar based on a dominant target is shown. A computing device may generate 1202 a signal through an ESA radar. The signal may pass through a radome surrounding the ESA radar and reflect off a dominant target. The ESA radar may then receive 1204 a high level return signal for analysis. If the radome has accumulated certain defects and wear, the signal and return signal may be distorted. In that case, the computing device may analyze 1206 the return signal to determine how the return signal differs from the expected far-field signal. The computing device may then determine a phase adjustment and an amplitude adjustment that will produce the expected far-field signal when distorted by the radome. The phase adjustment and amplitude adjustment may be embodied in one or more modifications to the aperture excitation of the ESA radar. When generating future signals, the computing device may modify 1208 the signal according to the phase adjustment and amplitude adjustment by superimposing the one or more modifications to the aperture excitation in the antenna.

The phase adjustment and amplitude adjustment may be embodied in one or more modifications to one or more radiating elements in an ESA antenna of the ESA radar; such modifications stored in an appropriate data structure. When generating future signals, the computing device may modify 1208 the ESA radar according to the phase adjustment and amplitude adjustment by applying the one or more modifications to the one or more radiating elements in the ESA antenna.

Figure 13:
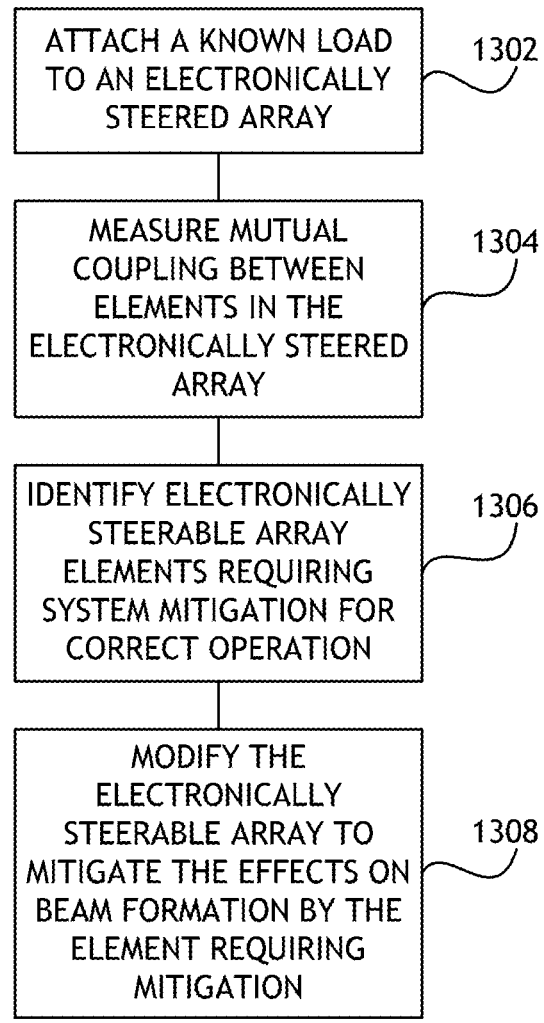
FIG. 13 shows a flowchart of a method for identifying sub-optimal ESA radiating elements.

Referring to FIG. 13, a flowchart of a method for identifying sub-optimal ESA radiating elements in shown. In one embodiment of the present invention, a computing device attempting to analyze mutual coupling between a first radiating element and a second radiating element in an ESA antenna of an ESA radar may attach 1302 all radiating elements to a matching load except the first radiating element and the second radiating element. The computing device may then transmit a signal through the first radiating element and receive a signal through the second radiating element. The signal received by the second radiating element may include features due to mutual coupling. The computing device may then measure 1304 the mutual coupling to determine if the first radiating element is operating outside normal operating parameters or having operating characteristics outside the permissible tolerance window of operation. By performing such analysis on all of the radiating elements in an ESA, the computing device may identify 1306 all of the sub-optimal radiating elements and modify 1308 signals sent to the radiating elements in the ESA antenna accordingly. Alternatively, the computing device may determine that no modification is possible to mitigate the effects of one or more sub-optimal radiating elements, and that additional servicing is required.

Furthermore, the computing device may determine that a distribution manifold connected to the radiating elements is performing sub-optimally. In that case, the computing device may determine a modification to mitigate the effects of a sub-optimal distribution manifold; or the computing device may determine that no modification is possible and that the distribution manifold should be replaced.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for determining modifications to a signal comprising:
    a processor;
    memory connected to the processor;
    a distribution manifold connected to the processor;
    an electronically scanned array (ESA) antenna comprising a plurality of radiating elements, each of the plurality of radiating elements connected to the distribution manifold; and
    computer executable program code configured to execute on the processor,
    wherein the computer executable program code is configured to:
        generate a transmit signal;
        send the transmit signal through the ESA antenna in a radome;
        receive a return signal through the ESA antenna;
        analyze the return signal by comparing the return signal to a reference far-field signal; and
        generate a modification to apply to subsequent signals based on the comparison of the return signal to the reference far-field signal.

2. The apparatus of claim 1, wherein such radome induces distortions in at least one of the transmit signal and the return signal.

3. The apparatus of claim 1, wherein the modification comprises a transformation to at least one of an aperture amplitude and an aperture phase, such transformations configured to pre-distort the signal.

4. The apparatus of claim 1, wherein the modification comprises one or more signal transformations, each associated with one radiating element in the ESA antenna.

5. The apparatus of claim 1, further comprising storing the modification.

6. The apparatus of claim 1, wherein the computer executable program code is further configured to:
    determine that at least one of the ESA antenna or the distribution manifold has operating characteristics outside the window of permissible tolerance; and
    determine that no modification can mitigate the effects of the ESA antenna or the distribution manifold operating outside the designed window of operation.

7. The apparatus of claim 1, wherein the computer executable program code is further configured to determine that the distribution manifold is operating outside a designed window of operation.

8. The apparatus of claim 7, the computer executable program code is further configured to determine a modification to mitigate the effects of the distribution manifold operating outside the designed window of operation.

9. The apparatus of claim 7, wherein the return signal comprises an induced portion due to mutual coupling.

10. The apparatus of claim 7, wherein analyzing the return signal comprises identifying, based on mutual coupling, whether a first radiating element is operating outside of normal operating parameters.

* * * * *